United States Patent
Ho

(10) Patent No.: US 7,339,922 B2
(45) Date of Patent: Mar. 4, 2008

(54) SYSTEM AND METHOD FOR SYNCHRONIZING TIMERS OVER WIRELESS NETWORKS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 11/022,190

(22) Filed: Dec. 22, 2004

(65) Prior Publication Data

US 2005/0141478 A1 Jun. 30, 2005

Related U.S. Application Data

(60) Provisional application No. 60/533,401, filed on Dec. 30, 2003.

(51) Int. Cl.
*H04J 3/06* (2006.01)
(52) U.S. Cl. ............... 370/350; 713/400; 713/375; 327/160
(58) Field of Classification Search ............ 370/350; 713/375, 600, 400; 327/160
See application file for complete search history.

(56) References Cited

U.S. PATENT DOCUMENTS

| | | | | |
|---|---|---|---|---|
| 5,918,040 A | * | 6/1999 | Jarvis | 713/375 |
| 5,926,048 A | * | 7/1999 | Greatwood | 327/160 |
| 6,633,989 B1 | * | 10/2003 | Hollins | 713/400 |

* cited by examiner

*Primary Examiner*—David Nguyen
(74) *Attorney, Agent, or Firm*—Steven A. Shaw; W. James Brady; Frederick J. Telecky, Jr.

(57) ABSTRACT

A method of synchronizing timers in a wireless network is described. According to some embodiments, a master timer is sampled at the start time of a first beacon in a first data object and the sampled master timer value is broadcast in a second beacon of a second data object. A slave timer is sampled at the start of the second beacon in the second data object and a value representing the duration of the first data object is subtracted from the sampled slave timer value to determine an updated sampled slave timer value. According to some variations, a difference is determined between the sampled master timer value and the updated sampled slave timer value. The method then uses the difference to synchronize the slave timer to the master timer and to other slaver timers synchronized to the same master timer.

9 Claims, 6 Drawing Sheets

SYSTEM AND METHOD FOR SYNCHRONIZING TIMERS OVER WIRELESS NETWORKS

RELATED APPLICATION DATA

This application is related to and claims priority from U.S. Provisional Patent Application No. 60/533,401 filed on Dec. 30, 2003, entitled "Timer Synchronization for IEEE 1394 over a wireless network" and assigned to the assignee of the present application. The provisional application is being incorporated herein by reference in its entirety for all purposes.

BACKGROUND

1. Field of the Invention

The present invention relates to wireless networks and more particularly, to timer synchronization in network nodes of wireless networks.

2. Description of the Related Art

Generally, various methods are used to synchronize timers between a data transmitter and a data receiver in a wireless network. Timers are used to time the processing of data transmitted/received in a data protocol object (e.g., frame, superframe, and the like). When the data are transmitted between entities executing the same data handling protocol, timers are synchronized using the same protocol; however, it is difficult to synchronize timers when the data are transmitted between entities executing different data handling protocols. A mediation or protocol interpretation scheme is required to communicate control information including the timer synchronization between the two entities executing different data handling protocols. One such mediation/protocol interpretation scheme is the Protocol Adaptation Layer (PAL) specified by the $1394^{SM}$ Trade Association in various working drafts, which are incorporated herein by reference in their entirety for all purposes.

The PAL mediates between a higher layer of a first protocol and a lower layer of a second protocol. The PAL mimics the behavior of the higher layer when transferring data objects from the lower layer to the higher layer. Similarly, the PAL mimics the behavior of the lower layer when transferring data objects from the higher layer to the lower layer. Typically, the PAL enables an application developed using the IEEE 1394 protocol to be adapted to another application developed using the IEEE 802.15.3 protocol. The IEEE 1394 protocol defines a universal interconnect bus for interconnecting a variety of consumer electronic devices and the IEEE 802.15.3 protocol defines a high rate Wireless Personal Area Network (WPAN) which enables connectivity between the variety of consumer electronic devices within a personal operating space. The PAL enables a virtual 1394 bus within an IEEE 802.15.3 piconet.

Typically, in a piconet, one device is designated as a network coordinator. The network coordinator is responsible to admit or exclude devices (nodes) that attempt to connect to the virtual 1394 bus within its piconet. The network coordinator periodically broadcasts bus and cycle timing information to all the nodes operating within the piconet to distribute accurate bus and cycle times for data interpretation by each node. Each node includes cycle timers, which are synchronized with the cycle time broadcast by the coordinator. The cycle timers are used to guarantee a constant delay for the transfer of data objects between two nodes. The cycle timers drift over time relative to one another and require synchronization to avoid delay jitter, receive buffer overflow/under run, and the like.

The PAL protocol defined by the $1394^{SM}$ Trade Association specifies a method of synchronizing the cycle timer. The method includes sampling a master timer (e.g., the cycle timer of a network coordinator) at the start time of a first beacon and broadcasting the sampled master timer value in a second beacon. The method further requires sampling a slave timer (e.g., the cycle timer of a data transmitting or receiving node) at the start of the first beacon and determining a difference between the sampled master timer value and the sampled slave timer value during the processing of the second beacon. The method uses the difference to correct the cycle time of the slave timer. This method causes the slave timer to oscillate when the master and slave timers have different initial values or when a beacon is not received correctly by the node containing the slave timer. Further, this method also requires correctly receiving two consecutive beacons to synchronize the master and slave timers. Accordingly, an effective method is needed to synchronize timers in a wireless network.

SUMMARY

The present application describes a method of synchronizing timers in a wireless network. According to some embodiments, a master timer (e.g., the cycle timer of a) is sampled at the start time of a first beacon in a first data object (e.g., a first superframe) and the sampled master timer value is broadcast in a second beacon of a second data object (e.g., a second superframe). A slave timer (e.g., the cycle timer of a data transmitting or receiving node) is sampled at the start of the second beacon in the second data object and a value representing the duration of the first data object (e.g., first superframe duration) is subtracted from the sampled slave timer value to determine an updated sampled slave timer value. According to some variations, a difference is determined between the sampled master timer value and the updated sampled slave timer value. The method then used the difference to adjust and synchronize the slave timer. Thus, one received beacon allows for one synchronization of the slave timer with the master timer. By way of synchronization with a common master timer, slave timers are mutually synchronized.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting non-limiting detailed description set forth below.

DESCRIPTION OF THE PREFERRED EMBODIMENT(S)

Figure 1A:
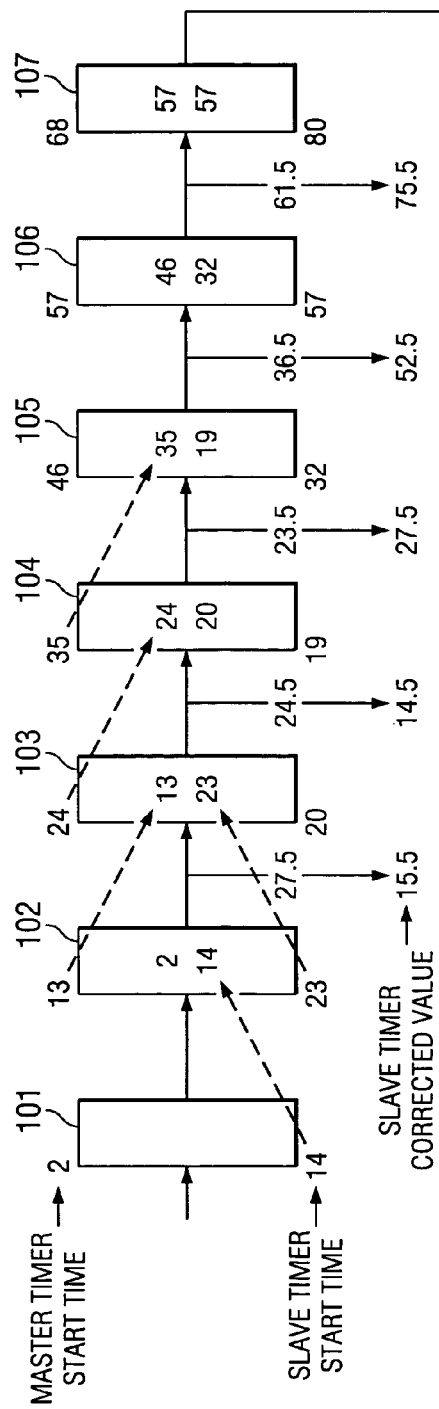
FIG. 1A illustrates an example of a prior art timer synchronization method in which the master and slave timers have different initial values.
Figure 1A:
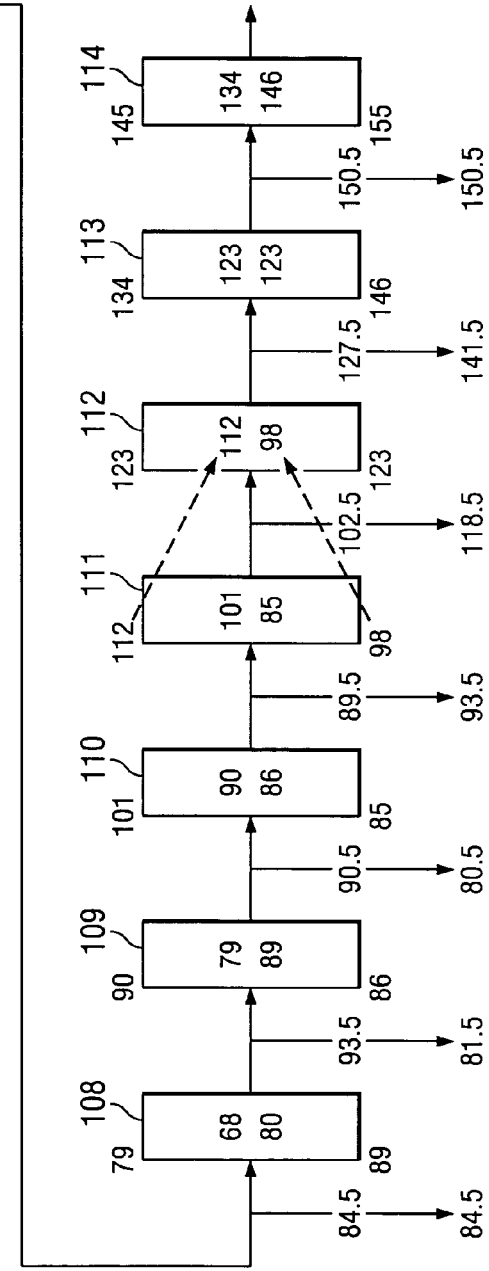

FIG. 1A illustrates an example of the prior art timer synchronization method in which the master and slave timers have different initial values. Data objects (e.g., frames) are transmitted from a master device to a slave device. The duration between beacons of two consecutive data objects is known as superframe duration. In the present example, the initial value of the master timer is 2 and the initial value of the slave timer is 14. The superframe duration is 10, the master timer increment per superframe is 11, and the slave timer increment per superframe is 9. A correction to the slave timer is made at the middle of each superframe.

According to the prior art synchronization method, the master timer is sampled at the start time of a beacon 101 and the sampled value, which is 2, is broadcasted in a next beacon 102 of the data object. The slave device also samples the slave timer at the start time of the beacon 101, which is 14. The master timer is sampled again at the start time of the beacon 102 and the sampled value, which is now 13, is broadcasted in a next beacon 103 of the data object. When the slave device receives the beacon 102, it samples again its timer, which is 23 (i.e., 14 plus the slave timer increment of 9 over a superframe). The slave device compares the master and slave timer value sampled in the previous beacon (i.e., beacon 101) and determines a difference by subtracting the master time sampled value from the slave timer sampled value. The slave device then uses the difference to adjust the slave timer for synchronization.

In the present example, the difference between the master timer sampled value and the slave timer sampled value is 12 (i.e., 14−2) at the start time of the beacon 101. The slave device applies this difference to correct its cycle timer in the middle of next superframe. The slave timer interval is 9, so the slave device applies the correction to the slave timer at the cycle time of 27.5 (i.e., 23 plus 4.5). The slave device subtracts the difference from its current cycle time and uses the resultant value to determine the corrected cycle time. In this case, the corrected cycle time determined by the slave device is 15.5 (i.e., 27.5 minus 12). Based on this corrected time, the slave device samples the slave timer again at the start time of the next beacon 103, which is 20 (i.e., 15.5 plus 4.5). The slave device compares the master and slave timer value sampled in the previous beacon (i.e., beacon 102) and determines a difference by subtracting the master time sampled value from the slave timer sample value. The difference now is 10 (i.e., 23−13). The slave device applies the difference to correct the slave timer in the middle of the next superframe. The clock synchronization procedure described above repeats in each successive superframe frame. Table 1 illustrates the master and slave timer values and their difference applied to correct the slave timer at each beacon interval (i.e., superframe).

TABLE 1

Original and corrected values for the master and slave timers which have different initial values according to the prior art synchronization method.

| Beacon # | Previous master timer value | Previous slave timer value | Difference | Current master timer value | Current slave timer value |
|---|---|---|---|---|---|
| 101 | N/A | N/A | N/A | 2 | 14 |
| 102 | 2 | 14 | 12 | 13 | 23 |
| 103 | 13 | 23 | 10 | 24 | 20 |
| 104 | 24 | 20 | −4 | 35 | 19 |
| 105 | 35 | 19 | −16 | 46 | 32 |
| 106 | 46 | 32 | −14 | 57 | 57 |
| 107 | 57 | 57 | 0 | 68 | 80 |
| 108 | 68 | 80 | 12 | 79 | 89 |
| 109 | 79 | 89 | 10 | 90 | 86 |
| 110 | 90 | 86 | −4 | 101 | 85 |
| 111 | 101 | 85 | −16 | 112 | 98 |
| 112 | 112 | 98 | −14 | 123 | 123 |
| 113 | 123 | 123 | 0 | 134 | 146 |

As illustrated in the Table 1, upon correction, the slave timer oscillates around the master timer with a magnitude proportional to the initial timer difference. Further, the slave device needs two consecutive beacons to adjust its cycle time. Due to the oscillation of the slave timer, the alignment of data for the data interpretation in a given set of data objects can vary for each data object, which can cause delay jitter and buffer overflow or underrun.

Figure 1B:
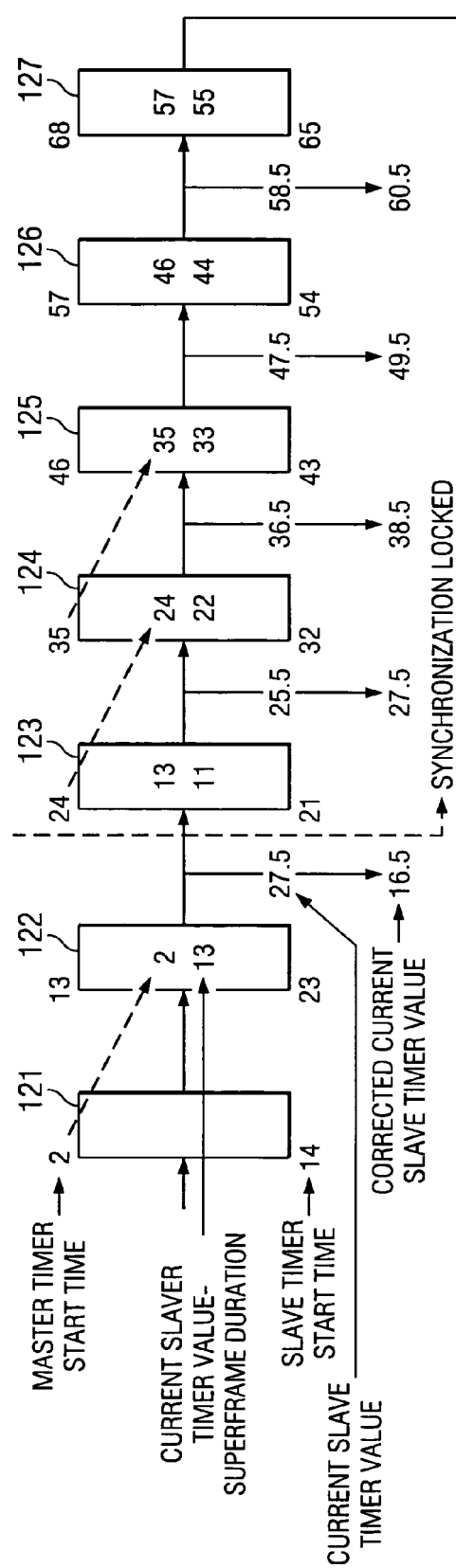
FIG. 1B illustrates an example of the timer synchronization method according to an embodiment of the present invention in which the master and slave timers have different initial values.
Figure 1B:
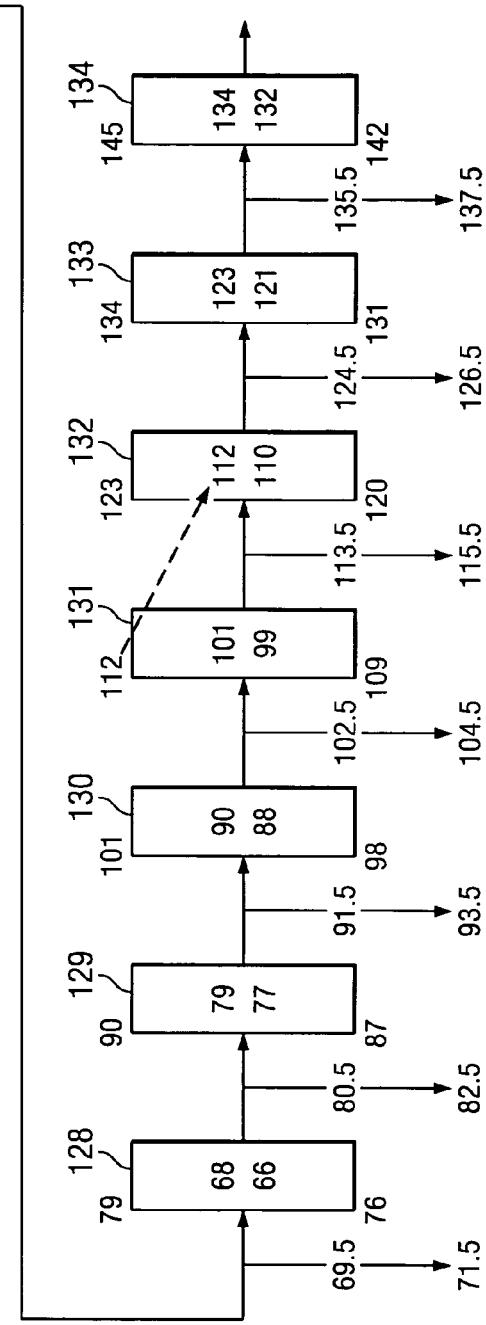

FIG. 1B illustrates an example of the timer synchronization method according embodiment of the present invention in which the master and slave timers have different initial values. In the present example, the initial value of the master timer is 2 and the initial value of the slave timer is 14. The superframe duration is 10, the master timer increment per superframe is 11, and the slave timer increment per superframe is 9. A correction to the slave timer is made at the middle of each superframe. These assumptions are the same as those for FIG. 1B.

In this embodiment, the master timer is sampled at the start time of a beacon 121 and the sampled value, which is 2, is broadcasted in a next beacon 122 of the data object. The master timer is sampled again at the start time of the beacon 122 and the sampled value, which is now 13, is broadcasted in a next beacon 123 of the data object. The slave device, when receiving the beacon 122, samples the slave timer, which is 23. The slave device receives the master timer sampled value in the beacon 122, and subtracts the previous superframe duration, which is 10, from the current slave timer sampled value 23 and uses the resultant value 13 to determine the difference with the master timer sampled value received in the beacon 122. For example, in the beacon 122, the master timer sampled value for the beacon 121 is 2 and the difference between the slave timer sampled value for the current beacon 122 and the previous superframe duration is 13 (i.e., 23 minus 10). Thus, the correction amount for the slave cycle timer is 13 minus 2, which is 11. The slave device uses this value to correct the cycle time of the slave timer.

In the present example, the slave timer interval is 9, and the slave device applies the correction, 11, to the slave timer at the middle of the superframe, which is 27.5 (23 plus 4.5). The slave device subtracts the correction amount from its current cycle time of 27.5 and uses the resultant value to determine the start of the next cycle time. In this case, the corrected cycle time determined by the slave device is 16.5 (i.e., 27.5 minus 11). Based on this current cycle time, the slave device samples its cycle timer again at the start time of the next beacon 123, which is 21 (i.e., 16.5 plus 4.5). The slave device subtracts the previous superframe duration, which is 10, from the last sampled value, which is 21. The resultant, 11, is subtracted by the sampled valued of the master timer at the beacon 122 but contained in the beacon 123, which is 13, to arrive at a difference of −2. The slave device applies this difference to correct its cycle timer at the middle of the current superframe.

In general, the slave device applies the correction to the slave timer at each beacon interval after receiving the master timer value sampled at the start time of the previous beacon and comparing it with the difference between the slave timer value sampled at the start of the current beacon and the previous superframe duration. The slave timer determines the correction value according to the following formula:

[Slave timer value sampled in the current beacon−the previous superframe duration]minus [Master time value sampled in the previous beacon].

This correction value is then subtracted from the existing slave timer value to adjust the slave timer at the middle of the current superframe.

Table 2 illustrates the master and slave timer values and their difference applied to correct the slave timer at each beacon interval (i.e., superframe).

TABLE 2

Original and corrected values for the master and slave timers which have different initial values according to one embodiment of the present invention.

| Beacon # (1) | Previous master timer value (2) | Current slave timer value (3) | Current slave timer value − last superframe duration (4) | Correction amount (5) = (4) − (2) | Current master timer value (6) | Current slave timer value (7) |
|---|---|---|---|---|---|---|
| 121 | N/A | 14 | 4 | N/A | 2 | 14 |
| 122 | 2 | 23 | 13 | 11 | 13 | 23 |
| 123 | 13 | 21 | 11 | −2 | 24 | 21 |
| 124 | 24 | 32 | 22 | −2 | 35 | 32 |
| 125 | 35 | 43 | 33 | −2 | 46 | 43 |
| 126 | 46 | 54 | 44 | −2 | 57 | 54 |
| 127 | 57 | 65 | 55 | −2 | 68 | 65 |
| 128 | 68 | 76 | 66 | −2 | 79 | 76 |
| 129 | 79 | 87 | 77 | −2 | 90 | 87 |
| 130 | 90 | 98 | 88 | −2 | 101 | 98 |
| 131 | 101 | 109 | 99 | −2 | 112 | 109 |
| 132 | 112 | 120 | 110 | −2 | 123 | 120 |
| 133 | 123 | 131 | 121 | −2 | 134 | 131 |

As illustrated in the Table 2, only one beacon is required to track the master timer compared to at least two consecutive beacons in the prior art method. After the first correction, the slave timer locks the synchronization and tracks the master timer monotonically with a maximum difference that is twice the relative drift per superframe.

Figure 2A:
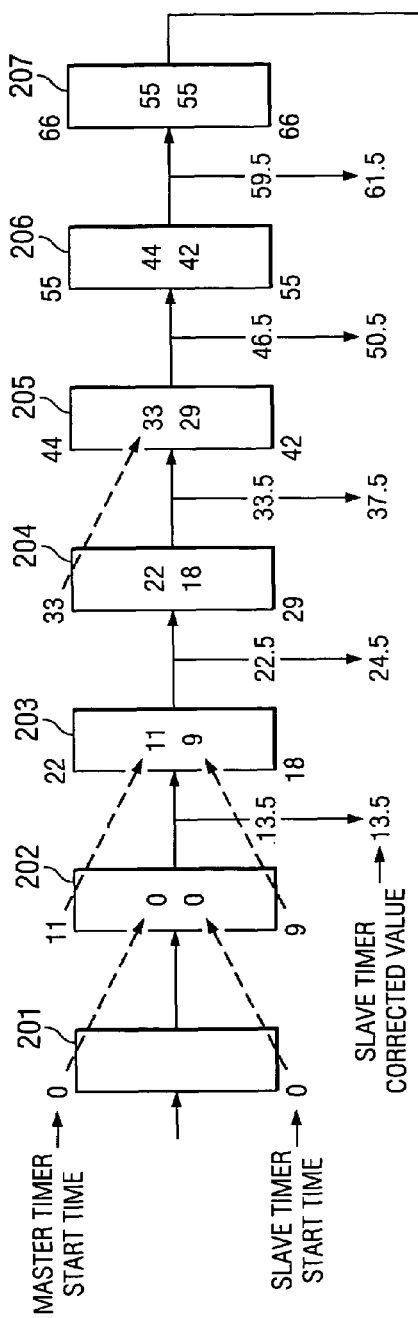
FIG. 2A illustrates an example of a prior art timer synchronization method in which the master and slave timers have common initial values.
Figure 2A:
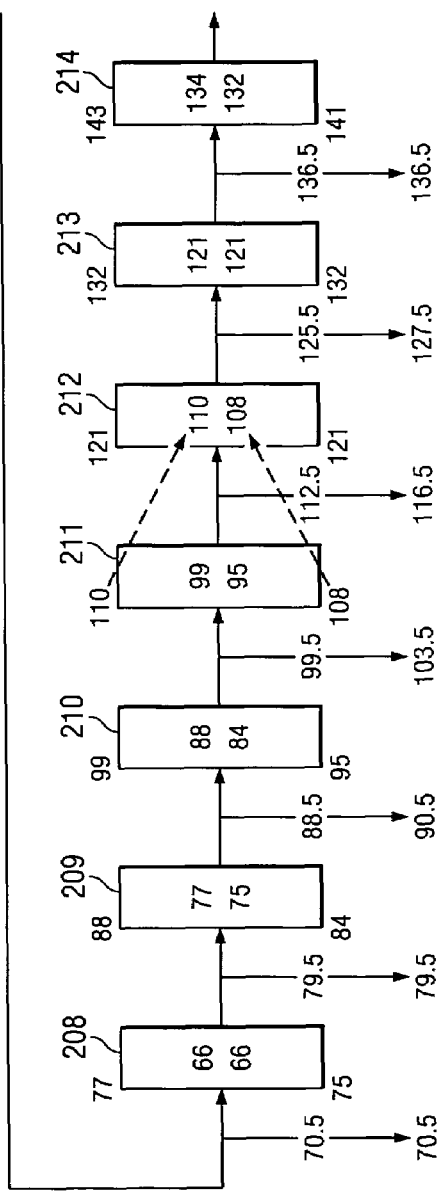

FIG. 2A illustrates an example of the prior art timer synchronization method in which the master and slave timers have common initial values of 0. The synchronization method is the same as described above with reference to FIG. 1A.

Table 3 illustrates the master and slave timer values and their difference applied to correct the slave timer at each beacon interval (i.e., superframe).

TABLE 3

Original and corrected timer values for the master and slave timers which have common initial values according to the prior art synchronization method.

| Beacon # | Previous master timer Value | Previous slave timer value | Difference | Current master timer value | Current slave timer value |
|---|---|---|---|---|---|
| 201 | N/A | N/A | N/A | 0 | 0 |
| 202 | 0 | 0 | 0 | 11 | 9 |
| 203 | 11 | 9 | −2 | 22 | 18 |
| 204 | 22 | 18 | −4 | 33 | 29 |
| 205 | 33 | 29 | −4 | 44 | 42 |
| 206 | 44 | 42 | −2 | 55 | 55 |
| 207 | 55 | 55 | 0 | 66 | 66 |
| 208 | 66 | 66 | 0 | 77 | 75 |
| 209 | 77 | 75 | −2 | 88 | 84 |
| 210 | 88 | 84 | −4 | 99 | 95 |
| 211 | 99 | 95 | −4 | 110 | 108 |
| 212 | 110 | 108 | −2 | 121 | 121 |
| 213 | 121 | 121 | 0 | 132 | 132 |

As illustrated in the Table 3, upon correction, the slave timer oscillates around the master timer with a magnitude that is twice the relative drift per superframe. Further, the slave device needs two consecutive beacons to adjust its cycle time. The magnitude of oscillation is smaller when the master and slave timers have the common initial values than when they have different initial values. However, it is not practical to assume the two timers to have the same value before synchronization is started, and hence the prior art synchronization method is not applicable in practice.

Figure 2B:
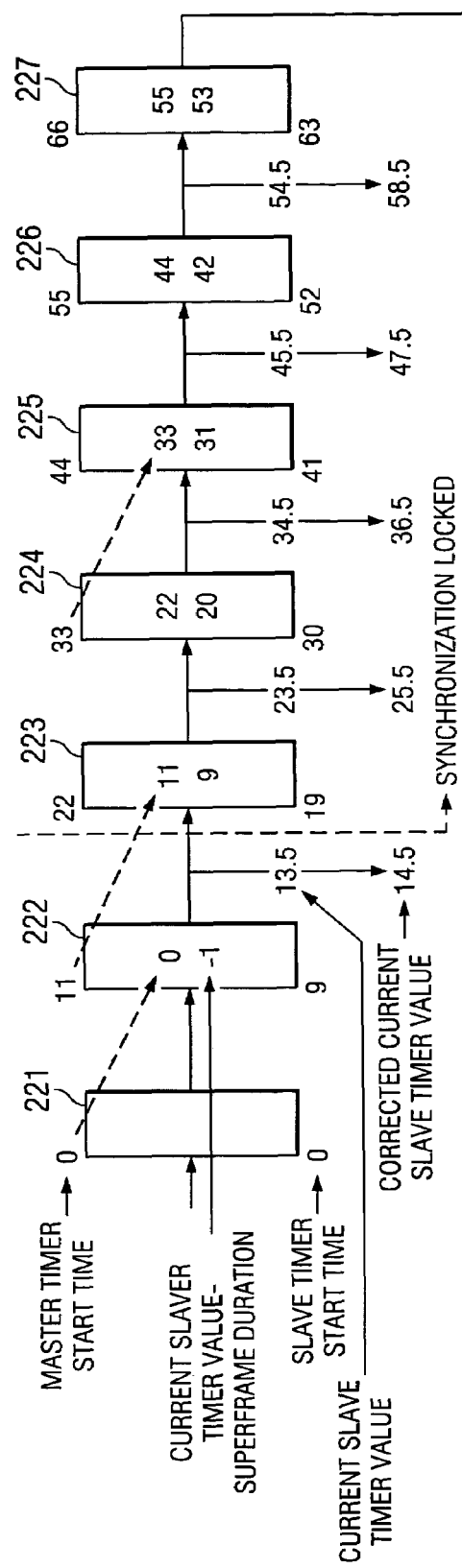
FIG. 2B illustrates an example of the timer synchronization method according to an embodiment of the present invention in which the master and slave timers have common initial values.
Figure 2B:
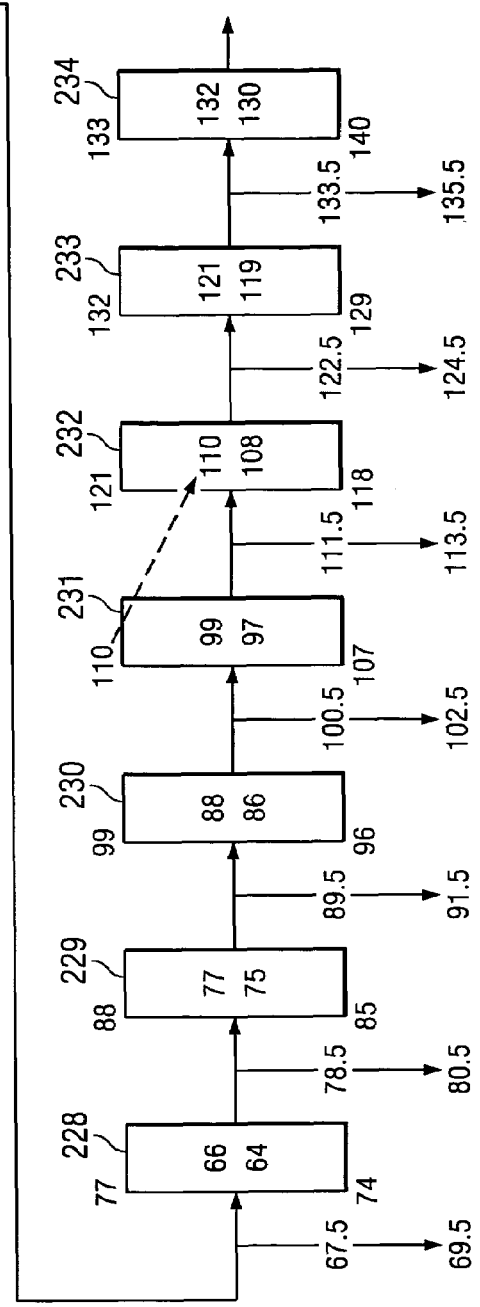

FIG. 2B illustrates an example of the timer synchronization method according to an embodiment of the present invention in which the master and slave timers have common initial values of 0. The synchronization method is the same as described above with reference to FIG. 1B.

Table 4 illustrates the master and slave timer values and their difference applied to correct the slave timer at each beacon interval (i.e., superframe).

TABLE 4

Original and corrected values for the master and slave timers which have common initial values according to one embodiment of the present invention.

| Beacon # (1) | Previous master timer value (2) | Current slave timer value (3) | Current slave timer value − last superframe duration (4) | Correction amount (5) = (4) − (2) | Current master timer value (6) | Current slave timer value (7) |
|---|---|---|---|---|---|---|
| 221 | N/A | 0 | −10 | N/A | 0 | 0 |
| 222 | 0 | 9 | −1 | −1 | 11 | 9 |
| 223 | 11 | 19 | 9 | −2 | 22 | 19 |
| 224 | 22 | 30 | 20 | −2 | 33 | 30 |
| 225 | 33 | 41 | 31 | −2 | 44 | 41 |
| 226 | 44 | 52 | 42 | −2 | 55 | 52 |
| 227 | 55 | 63 | 53 | −2 | 66 | 63 |
| 228 | 66 | 74 | 64 | −2 | 77 | 74 |
| 229 | 77 | 85 | 75 | −2 | 88 | 85 |
| 230 | 88 | 96 | 86 | −2 | 99 | 96 |
| 231 | 99 | 107 | 97 | −2 | 110 | 107 |
| 232 | 110 | 118 | 108 | −2 | 121 | 118 |
| 233 | 121 | 129 | 119 | −2 | 132 | 129 |

As illustrated in the Table 4, after the first correction following the beacon 222, the slave timer locks the synchronization and tracks the master timer monotonically with a maximum difference that is twice the relative drift per superframe. Further, only one beacon is required to track the master timer compared to at least two consecutive beacons in the prior art method. Therefore, the present invention enables the synchronization of the slave timer with the master timer regardless of their initial values at the start of synchronization.

Figure 3A:
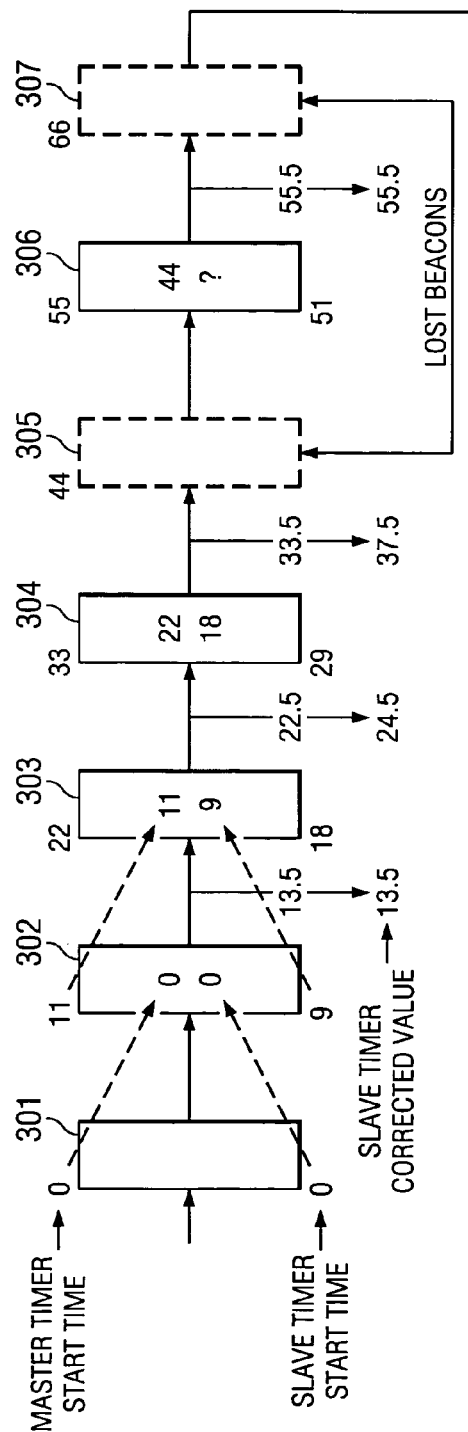
FIG. 3A illustrates an example of a prior art synchronization method when beacons are lost at reception.
Figure 3A:
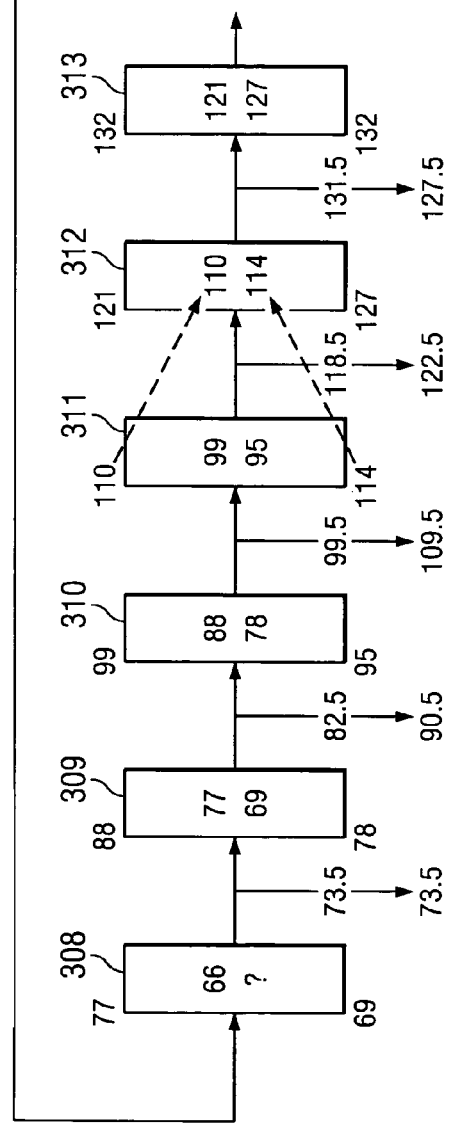

FIG. 3A illustrates an example of prior art synchronization method when beacons are lost during the transmission. The synchronization method is the same as described above with reference to FIG. 1A. In the present example, the slave device does not receive beacons 305 and 307. The last correction applied by the slave device was at a half beacon interval after the beacon 304. It adjusted the slave timer from 33.5 to 37.5. Because the beacon 305 is lost, the slave device receives the next beacon, the beacon 306, at the slave timer value of 51 (i.e., 37.5+4.5+9). The beacon 306 is received by the slave device so the slave device attempts to synchronize with the master timer; however, because the beacon 305 was lost, the slave device did not have the sampled value for the slave timer at the start time of the beacon 305. Thus, the slave device makes no correction to its timer even though the beacon 306 was received.

In the present example, the next beacon 307 is also lost at reception, so the slave device progresses to the next beacon interval at the local time of 69 (51+9+9). At beacon 308, the slave device has the sampled value for the master timer at the start time of the previous beacon but does not have the sampled value for the slave timer at the start time of the previous beacon. The slave device thus makes no adjustment to its timer after receiving the beacon 308. The slave device resumes its timer correction after receiving the next beacon, beacon 309, at the local time of 78 (69+9), using the method described with respect to FIG. 1A. Table 5 illustrates the master and slave timer values and their difference applied to correct the slave timer at each beacon interval (i.e., superframe).

TABLE 5

Original and corrected timer values for the master and slave timers which have common initial values when some bacons are lost according to the prior art synchronization method.

| Beacon # | Previous master timer Value | Previous slave timer value | Difference | Current master timer value | Current slave timer value |
|---|---|---|---|---|---|
| 301 | N/A | N/A | N/A | 0 | 0 |
| 302 | 0 | 0 | 0 | 11 | 9 |
| 303 | 11 | 9 | −2 | 22 | 18 |
| 304 | 22 | 18 | −4 | 33 | 29 |
| 305 | 33 | 29 | Beacon loss | 44 | 42 |
| 306 | 44 | 42 | N/A | 55 | 51 |
| 307 | 55 | 51 | Beacon loss | 66 | 60 |
| 308 | 66 | 60 | N/A | 77 | 69 |
| 309 | 77 | 69 | −8 | 88 | 78 |
| 310 | 88 | 78 | −10 | 99 | 95 |
| 311 | 99 | 95 | −4 | 110 | 114 |
| 312 | 110 | 114 | 4 | 121 | 127 |
| 313 | 121 | 127 | 6 | 132 | 132 |

As illustrated in the Table 4, even if the master and slave timers were assume to have the common initial values at the start of synchronization, the slave timer oscillates around the master timer with an increased magnitude after each loss of a beacon. The prior art synchronization method is thus susceptible to beacon losses which cannot be prevented in a wireless network.

Figure 3B:
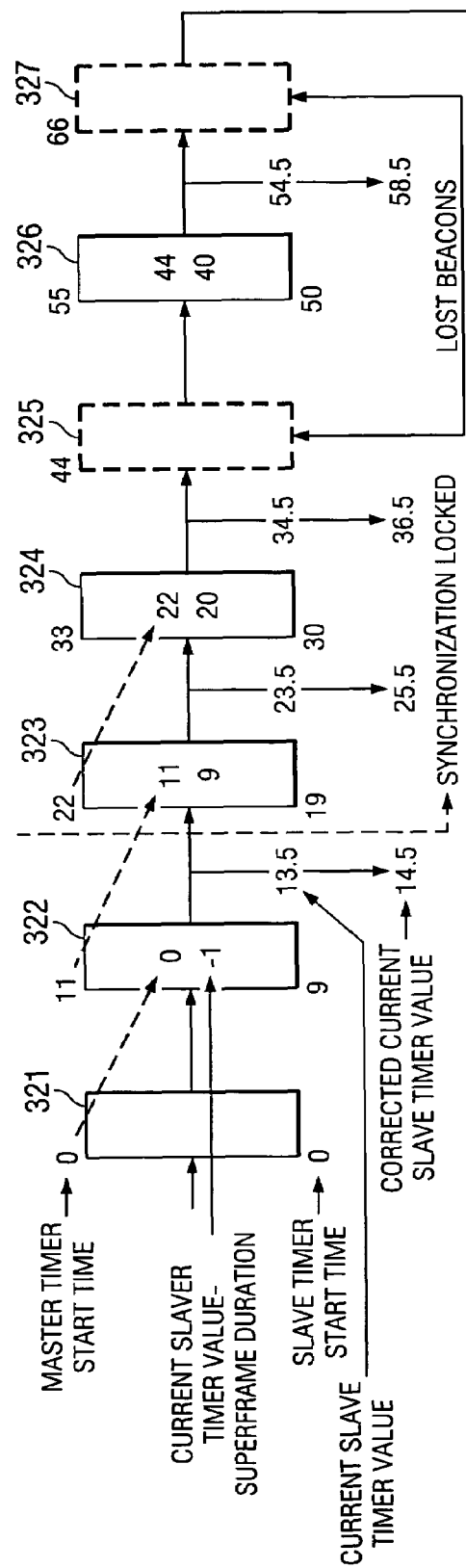
FIG. 3B illustrates an example of the synchronization method when beacons are lost at reception according to an embodiment of the present invention.
Figure 3B:
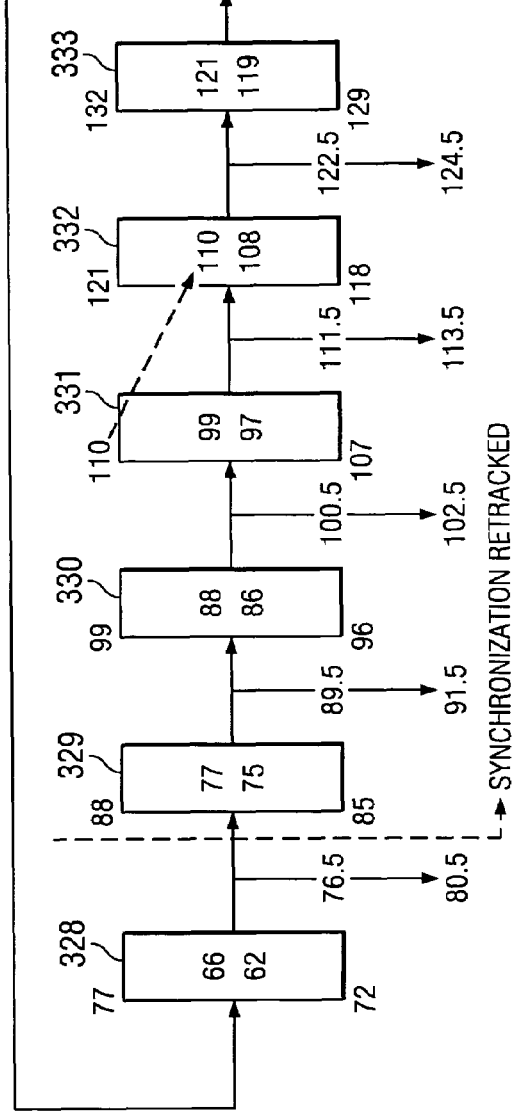

FIG. 3B illustrates an example of the synchronization method when beacons are lost during the transmission according to an embodiment of the present invention. The synchronization method is the same as described above with reference to FIG. 1B. In the present example, the slave device does not receive beacons 325 and 327. Before the beacon 325 is lost, the last correction applied by the slave device was at a half beacon interval after the beacon 324. It adjusted the slave timer from 34.5 to 36.5. Because the beacon 325 is lost, the slave device receives the next beacon, the beacon 326, at the slave timer value of 50 (i.e., 36.5+4.5+9). The beacon 326 is received by the slave device so the slave device attempts to synchronize with the master timer.

Because the slave device uses the sampled value of the local timer at the start of the received beacon 326, the slave device does not have to rely on the lost beacon, beacon 325, for a sampled timer value. The slave device subtracts the superframe duration, which is 10, from the sampled value of the current beacon, which is 50, and uses the resultant, which is 40, to determine the correction amount. The slave device determines the correction amount by subtracting from the resultant the master timer value sampled at the start of the previous beacon, which is 44, and determines the correction factor −4. The slave device uses this correction amount to adjust the current timer to 58.5 (54.5+4) half a beacon interval after the start of the beacon 326.

In the present example, the next beacon 327 is also lost, so the slave device progresses to the next beacon interval at the local time of 72 (58.5+4.5+9), when it receives the beacon 328. The slave device then resumes timer correction as described in the above. Table 6 illustrates the master and slave timer values and their difference applied to correct the slave timer at each beacon interval (i.e., superframe).

TABLE 6

Original and corrected timer values for the master and slave timers which have common initial values when some of the beacons are lost according to one embodiment of the present invention.

| Beacon # (1) | Previous master timer value (2) | Current slave timer value (3) | Current slave timer value − last superframe duration (4) | Correction amount (5) = (4) − (2) | Current master timer value (6) | Current slave timer value (7) |
|---|---|---|---|---|---|---|
| 321 | N/A | 0 | −10 | N/A | 0 | 0 |
| 322 | 0 | 9 | −1 | −1 | 11 | 9 |
| 323 | 11 | 19 | 9 | −2 | 22 | 19 |
| 324 | 22 | 30 | 20 | −2 | 33 | 30 |
| 325 | 33 | 41 | 31 | Beacon loss | 44 | 41 |
| 326 | 44 | 50 | 40 | −4 | 55 | 50 |
| 327 | 55 | 63 | 53 | Beacon loss | 66 | 63 |
| 328 | 66 | 72 | 62 | −4 | 77 | 72 |
| 329 | 77 | 85 | 75 | −2 | 88 | 85 |
| 330 | 88 | 96 | 86 | −2 | 99 | 96 |
| 331 | 99 | 107 | 97 | −2 | 110 | 107 |
| 332 | 110 | 118 | 108 | −2 | 121 | 118 |
| 333 | 121 | 129 | 119 | −2 | 132 | 129 |

As illustrated in the Table 6, once the slave device receives a beacon, it can make a timer correction, and the slave timer will retract the master timer monotonically as if no beacon had been lost. Therefore, the present invention enables synchronization to recover from beacon losses.

Realizations in accordance with the present invention have been described in the context of particular embodiments. These embodiments are meant to be illustrative and not limiting. Many variations, modifications, additions, and improvements are possible. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of synchronizing timers of devices in a wireless network comprising:
   receiving a start time of a first data object in a second data object;
   using the start time of the first data object to synchronize a slave timer in a slave communication device, wherein the slave timer is synchronized by
      determining a timing correction amount by subtracting an interval between the first data object and the second data object from the slave timer value at the start time of the second data object to obtain an updated slave timer value,
      subtracting the start time of the first data object from the updated slave timer value to obtain the timing correction amount, and
      adjusting the slave timer using the timing correction amount.

2. A method according to claim 1, wherein the data objects are beacons transmitted by a master communication device in the wireless network.

3. A method according to claim 2, wherein the master communication device is a network coordinator in the wireless network.

4. A method according to claim 1, wherein the data objects are frames transmitted by a wireless communication device in the wireless network.

5. A communication device configured to:
   receive a first data object and a second data object from a remote communication device; and
   synchronize a local timer with timings of the data objects by
      determining a timing correction amount by subtracting an interval between the first data object and the second data object from a local timer value of the communication device at the start time of the second data object to obtain an updated local timer value,
      subtracting the start time of the first data object from the updated local timer value to obtain the timing correction amount, and
      adjusting the local timer of the communication device using the timing correction amount, wherein the start time of the first data object is included in the second data object.

6. A communication device according to claim 5, wherein the data objects are beacons transmitted by a remote communication device.

7. A communication device according to claim 5, wherein the data objects are frames transmitted by a remote communication device.

8. A communication device according to claim 5, wherein the remote communication device is a network coordinator in a wireless network.

9. A communication device according to claim 5, wherein the remote communication device is a wireless communication device in a wireless network.

* * * * *